(12) United States Patent
Silvert

(10) Patent No.: US 10,783,088 B2
(45) Date of Patent: Sep. 22, 2020

(54) SYSTEMS AND METHODS FOR PROVIDING CONNECTED ANTI-MALWARE BACKUP STORAGE

(71) Applicant: Red Hat, Inc., Raleigh, NC (US)

(72) Inventor: Stan Silvert, McDonough, GA (US)

(73) Assignee: RED HAT, INC., Raleigh, NC (US)

(*) Notice: Subject to any disclaimer, the term of this patent is extended or adjusted under 35 U.S.C. 154(b) by 206 days.

(21) Appl. No.: 15/851,295

(22) Filed: Dec. 21, 2017

(65) Prior Publication Data
US 2019/0196981 A1 Jun. 27, 2019

(51) Int. Cl.
| G06F 21/00 | (2013.01) |
| G06F 12/14 | (2006.01) |
| H04L 29/06 | (2006.01) |
| G06F 3/06 | (2006.01) |
| G06F 21/56 | (2013.01) |
| G06F 21/62 | (2013.01) |

(52) U.S. Cl.
CPC .......... *G06F 12/1408* (2013.01); *G06F 3/065* (2013.01); *G06F 3/0619* (2013.01); *G06F 3/0688* (2013.01); *G06F 21/56* (2013.01); *G06F 21/568* (2013.01); *G06F 21/6218* (2013.01); *H04L 63/061* (2013.01); *G06F 2221/2107* (2013.01)

(58) Field of Classification Search
None
See application file for complete search history.

(56) References Cited

U.S. PATENT DOCUMENTS

| 8,176,274 | B2 | 5/2012 | Branigan |
| 2006/0143530 | A1* | 6/2006 | Largman ............ G06F 11/1417 714/36 |

(Continued)

FOREIGN PATENT DOCUMENTS

DE 202006000075 U1 4/2006

OTHER PUBLICATIONS

"*UltraBlock USB 3.0 IDE-SATA Write Blocker*" 2 pages, Digital Intelligence, Jul. 4, 2017, https://www.digitalintelligence.com/products/ultrablock_usb3_ide-sata_ro/.

(Continued)

*Primary Examiner* — Andrew J Steinle
(74) *Attorney, Agent, or Firm* — Haynes and Boone, LLP

(57) ABSTRACT

Methods, systems, and computer devices are included for data backup. An example method includes receiving an activation signal from a hardware input of a data storage device that is operating in a read-only mode. In response to receiving the activation signal, a backup application is provided from the data storage device to a computing device that is communicatively coupled to the data storage device. An authenticated session is established between the data storage device and the backup application that is executed on the computing device. Backup data from the computing device is received via the authenticated session. The authenticated session causes the data storage device to operate in at least a write mode with respect to the received backup data during the authenticated session. The received backup data is written to the data storage device. If the authenticated session is terminated, the data storage device returns to a read-only mode.

20 Claims, 4 Drawing Sheets

(56) References Cited

U.S. PATENT DOCUMENTS

| | | | |
|---|---|---|---|
| 2008/0046990 A1* | 2/2008 | Narayanaswami | H04L 63/0428 726/9 |
| 2008/0046997 A1 | 2/2008 | Wang | |
| 2011/0113235 A1* | 5/2011 | Erickson | G06F 21/34 713/152 |
| 2011/0191769 A1* | 8/2011 | Brunet | G06F 17/00 717/176 |
| 2012/0260039 A1 | 10/2012 | Yao et al. | |
| 2015/0172304 A1* | 6/2015 | Kleczynski | H04L 63/1416 726/23 |
| 2017/0076096 A1 | 3/2017 | Challener et al. | |

OTHER PUBLICATIONS

"*Windows 10 will use Protected Folders to Thwart Crypto Ransomware*" 22 pages, https://news.ycombinator.com/item?id=14688679.
"*Protect External Hardware from Ransomware*" BleepingComputer. com, May 26, 2017, 4 pages, https://www.bleepingcomputer.com/forums/t/647746/protect-external-hardware-from-ransomware/page-2.

\* cited by examiner

SYSTEMS AND METHODS FOR PROVIDING CONNECTED ANTI-MALWARE BACKUP STORAGE

FIELD OF DISCLOSURE

The present disclosure generally relates to computerized data processing systems and corresponding methods for data back-up and recovery, and maintaining integrity of files, records, directories and databases, and more particularly to protecting data from malware.

BACKGROUND

Malware is a term that refers to malicious software. Malware includes software that is designed with malicious intent to cause intentional harm and/or bypass security measures. Examples of malware include viruses, worms, ransomware, spyware, adware, rootkits and so forth. Malware causes many issues for users, including negatively affecting the resources of a computing device, invading user privacy by stealing information, adversely affecting computing device stability, and/or hijacking a computing device for illegitimate purposes. In many instances, users may not even be aware of the presence of the malware.

As an example of the problems caused by malware, the global WannaCry ransomware attack of May 2017 took hostage more than 230,000 computers across 150 countries when it encrypted their data and conditioned decryption upon the payment of a ransom. Big banks, multinational businesses, and even national hospitals were among those hit by the ransomware. Thus, as hospital administrators, bankers, and logistics managers lost access to their most important data—now encrypted by the ransomware—CEOs and managers found themselves faced with an impossible decision: pay over the ransom in the hopes that the ransomers would make good on their promise to decrypt the data, or spend thousands of man-hours attempting to restore or recreate the encrypted data.

In the wake of WannaCry and other malware, a whole suite of preventative measures have been recommended, including asking users to frequently back up their important data to a backup data storage device. While effective against some types of malware, such measures are less effective against other strains of evolved malware which have the ability to detect and infiltrate backup devices. What is needed is a data backup mechanism which is secure even from evolved malware, while remaining practically useful.

SUMMARY

A system of one or more computers can perform particular operations or actions by virtue of having software, firmware, hardware, or a combination thereof installed on the system that in operation causes or cause the system to perform the actions. One or more computer programs can perform particular operations or actions by virtue of including instructions that, when executed by data processing apparatus, cause the apparatus to perform the actions. One general aspect includes a system including: a non-transitory memory, and one or more hardware processors coupled to the non-transitory memory to execute instructions from the non-transitory memory to perform operations including: receiving an activation signal from a hardware input of a data storage device that is operating in a read-only mode; responsive to the receiving, providing a backup application from the data storage device to a computing device that is communicatively coupled to the data storage device; establishing an authenticated session between the data storage device and the backup application that is executed on the computing device; receiving, via the authenticated session, backup data from the computing device, the authenticated session causing the data storage device to operate in at least a write mode with respect to the received backup data during the authenticated session; writing the received backup data to the data storage device. Other examples of this aspect include corresponding computer systems, apparatus, and computer programs recorded on one or more computer storage devices, each to perform the actions of the methods.

One general aspect includes a computer-implemented method including: receiving an activation signal from a hardware input of a data storage device that is operating in a read-only mode. The computer-implemented method also includes responsive to the receiving, providing a backup application from the data storage device to a computing device that is communicatively coupled to the data storage device. The computer-implemented method also includes establishing an authenticated session between the data storage device and the backup application that is executed on the computing device. The computer-implemented method also includes receiving, via the authenticated session, backup data from the computing device, the authenticated session causing the data storage device to operate in at least a write mode with respect to the received backup data during the authenticated session. The computer-implemented method also includes writing the received backup data to the data storage device. Other examples of this aspect include corresponding computer systems, apparatus, and computer programs recorded on one or more computer storage devices, each to perform the actions of the methods.

One general aspect includes a non-transitory machine-readable medium having stored thereon machine-readable instructions executable to cause at least one machine to perform operations including: receiving an activation signal from a hardware input of a data storage device that is operating in a read-only mode; responsive to the receiving, providing a backup application from the data storage device to a computing device that is communicatively coupled to the data storage device; establishing an authenticated session between the data storage device and the backup application that is executed on the computing device; receiving, via the authenticated session, backup data from the computing device, the authenticated session causing the data storage device to operate in at least a write mode with respect to the received backup data for a during the authenticated session; writing the received backup data to the data storage device. Other examples of this aspect include corresponding computer systems, apparatus, and computer programs recorded on one or more computer storage devices, each to perform the actions of the methods.

Figure 1:
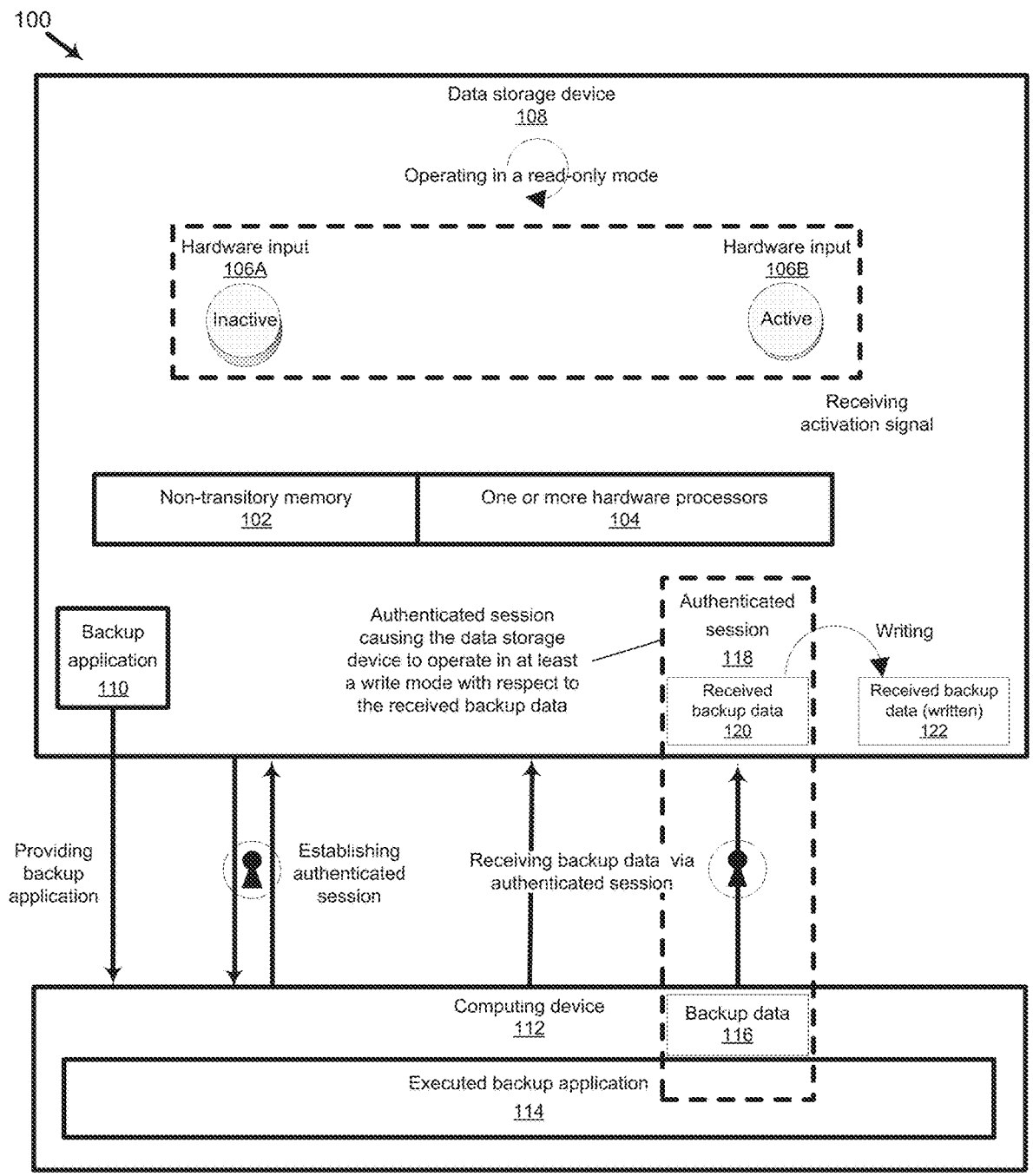
FIG. 1 is an organizational diagram illustrating a system including a non-transitory memory and one or more hardware processors for backing up data to a data storage device.

Examples of the present disclosure and their advantages are best understood by referring to the detailed description that follows.

DETAILED DESCRIPTION

In the following description, specific details are set forth describing some examples consistent with the present disclosure. It will be apparent, however, to one skilled in the art that some examples may be practiced without some or all of these specific details. The specific examples disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one example may be incorporated into other examples unless specifically described otherwise or if the one or more features would make an example non-functional.

One way to counteract the strains of malware which have gained the ability to detect and infiltrate backup devices is to ask users to disconnect, and keep disconnected, their backup devices from their computing devices after each backup. But the added hassle, coupled with the high probability that a user would inadvertently forget to disconnect the backup device, drastically limits the practical utility of such a preventative measure.

Various examples described herein provide improved techniques for backing up data to a data storage device. As a high-level overview, the data storage device, which can be an external hard drive or flash drive, operates by default in a read-only mode. But when a user activates a hardware input such as a button or a switch acting on the data storage device, the device becomes writable with respect to authenticated data. Specifically, only the data which is received via an authenticated session using an authenticated backup application may be written to the data storage device.

To process the various computer instructions involved in activation, authentication, and so forth, the data storage device includes an onboard computer system. The computer system includes a processor, such as a central processing unit (CPU), coupled to a memory, such as a random access memory (RAM). Working together, the processor and memory can perform computer operations. For example, when a user activates the hardware input, an activation signal is sent to the onboard computer system. In response, the system sends a backup application from the data storage device to a computing device, such as a laptop, which is connected to the data storage device.

The backup application is run on the computing device, and the system establishes an authenticated session between the data storage device and the backup application. Receiving data through an authenticated session secures the received data and verifies the identity of the sender. In particular, the authenticated session verifies that the sender of the data is indeed the backup application and not some other rogue application or malware pretending to be the backup application. Moreover, only the backup data which is received via the authenticated session may be written to the data storage device. Various methods may be used for the authentication, including public key infrastructure (PKI) authentication, two factor authentication, biometric authentication, one-time passwords (OTP), OTP tokens, out-of-band verification, peripheral device recognition, etc.

Because of the presence of various identifying factors in or of an authenticated session, for instance cryptographic keys and markers, the system is able to distinguish between data received via the authenticated session versus data received via other channels. Thus, while the authenticated session is running, the system permits an exception to the data storage device's default read-only mode. First, the system permits the data storage device to receive backup data from the computing device. Second, the system also permits the received backup data to be written to the data storage device, so long as the data was received via the authenticated session. Assuming sufficient storage space is available, the received backup data is written to the data storage device.

The techniques herein provide useful advantages. Unlike a conventional backup device which relies on being disconnected except when performing (infrequent) backups to protect itself against malware, a connected anti-malware backup device can remain connected and remain freely usable by a user for non-write operations. A connected anti-malware device is also more convenient to use, and less wasteful of resources than a conventional backup device. Because conventional devices must remain disconnected except when performing (infrequent) backups, a user taking the proper precautions against malware must go through the inconvenience of physically disconnecting the conventional device after each backup. Moreover, since backups occur infrequently, a user would barely be able to use the backup device; in essence, the user would only be able to use the backup device when actually performing a backup, and even then, at greatly reduced speeds and availability because of all the resources consumed by the backup process. Even if a user were diligent, and were willing to put up with the inconvenience of disconnecting and reconnecting a conventional backup device, the user is still exposed to a not insignificant risk of malware infection for the duration that a conventional backup device is connected to the user's computing device.

By contrast, with a connected anti-malware backup device, a user would be safeguarded from malware while still being able to effectively use the device almost all of the time (perhaps, except during backups when resource utilization is high). Whereas a conventional device cannot be accessed while it sits disconnected, a user of a connected anti-malware backup device would be able to freely pull up archived bank records or medical history reports, play a favorite music collection or revisit past memories, and even dig up old emails and look up old contacts, because the techniques herein keep the device safe from malware even when it is left connected.

Additionally, a connected anti-malware data storage device is also superior to a memory card equipped with a write-protect switch. A user may simply forget to return the memory card to read-only after completing the backup, inadvertently fully exposing the backup device to a malware attack. Purely software-based write-protect switches would not likely fare much better, as they would pose little more than a minor hindrance to the types of sophisticated hackers who have developed malware to exploit vulnerabilities of operating systems built by multibillion dollar corporations. The connected anti-malware device overcomes the limitations of both by employing a hybrid of hardware activation and software authentication techniques.

FIG. 1 is an organizational diagram illustrating a system 100 for backing up data to a data storage device.

The system 100 includes a non-transitory memory 102 and one or more hardware processors 104 coupled to the non-transitory memory 102. In the present example, the one or more hardware processors 104 executes instructions from the non-transitory memory 102 to perform operations for backing up received backup data 116 to a data storage device 108. In the present example, the non-transitory memory 102 and the one or more hardware processors 104 are depicted located on the data storage device 108, however they may also be located on a computing device 112 communicatively coupled to the data storage device 108.

Each of the one or more hardware processors 104 is structured to include one or more general-purpose processing devices such as a microprocessor, central processing unit (CPU), and the like. More particularly, a processor may include a complex instruction set computing (CISC) microprocessor, reduced instruction set computing (RISC) microprocessor, very long instruction word (VLIW) microprocessor, or a processor implementing other instruction sets or processors implementing a combination of instruction sets. In some examples, each processor is structured to include one or more special-purpose processing devices such as an application specific integrated circuit (ASIC), a field programmable gate array (FPGA), a digital signal processor (DSP), network processor, and so forth. The one or more processors execute instructions for performing the operations, steps, and actions discussed herein.

A non-transitory memory 102 is structured to include at least one non-transitory machine-readable medium on which is stored one or more sets of instructions (e.g., software) including any one or more of the methodologies or functions described herein. The non-transitory memory may be structured to include one or more of a read-only memory (ROM), flash memory, dynamic random access memory (DRAM) such as synchronous DRAM (SDRAM), double data rate (DDR SDRAM), or DRAM (RDRAM), and so forth), static memory (e.g., flash memory, static random access memory (SRAM), and so forth), and a data storage device (e.g., hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read). Accordingly, any of the operations, steps, and actions of the methods described herein may be implemented using corresponding machine-readable instructions stored on or in a memory that are executable by a processor.

The data storage device 108 includes a logic board on which the system 100 and other components are housed, and a bus or other communication mechanism for communicating information data, signals, and information between the various components of the data storage device 108. Components include one or more hardware inputs 106A/106B, which may be in an active state 106A or inactive state 106B. Hardware input 106A/106B may include, but is not limited to: mechanical, electromechanical, or electrical switches, such as in buttons, switches and piezoelectric switches; touch-based interface modules, such as in fingerprint readers or touch screens; keyboard modules, such as in alphanumeric keyboards and keypads; visible light-based image modules, such as in digital cameras or iris scanners; non-visible light based modules, such as in digital infrared cameras; combination visible light- and non-visible light based modules, such as in depth-sensing cameras; acoustic wave modules, such as in microphones and ultrasonic sensors; radio frequency modules, such as in radio-frequency identification (RFID), near field communication (NFC); light sensors; motion sensors; position sensors; gyroscopic sensors; accelerometers; etc. The components may also include one or more controller circuits and/or one or more host adapters, which enable the one or more hardware processors 104 to communicate with the components of the data storage device.

Depending on the type of hardware input 106A/106B used, a user may use different means to activate the hardware input 106A/106B. For example, a user may activate hardware input 106A/106B by: applying a force (e.g., by pushing a button); presenting biometric identification (e.g., using a fingerprint reader or iris scanner); entering a code (e.g., using a personal identification number (PIN) pad); drawing a code (e.g., using a touch screen); presenting a recognized feature (e.g., facial recognition using a digital camera and depth-sensing camera); gesturing (e.g., using a digital camera or ultrasonic module); voicing a command (e.g., using a microphone); placing an access token in proximity to a sensor (e.g., RFID or NFC tagging); etc. Other activation methods are possible, depending on the type of hardware input 106A/106B.

The data storage device 108 includes one or more interfaces used for communicating with computing device 112. The interface may be a port, a slot, or a network interface.

In some examples, the data storage device 108 may be connected to computing device 112 via a port interface, such as a universal serial bus (USB) using a USB cable. Further examples of port interfaces include THUNDERBOLT and FIREWIRE, though these are exemplary and other port interfaces for transferring data may be used.

In other examples, the data storage device 108 may be connected to the computing device 112 via a slot interface, such as a non-volatile memory express (NVME) slot. Other examples of slots include: PERIPHERAL COMPONENT INTERCONNECT (PCI), PERIPHERAL COMPONENT INTERCONNECT EXPRESS (PCI-E), non-volatile memory express (NVME), serial advanced technology attachment (SATA), external SATA (eSATA), parallel advanced technology attachment (PATA), integrated drive electronics (IDE), small computer system interface (SCSI), serial attached SCSI (SAS), etc. These are exemplary, and other types of slots for transferring data may be used. Where the interface is a slot interface, the hardware input 106A/106B may be located in a conveniently accessible location, such as on the chassis of the computing device 112.

In further examples, the data storage device 108 may be connected to device 112 via a network interface. For example, a WiFi network interface may be included in both the data storage device 108 and the computing device 112 so that they can communicate with each other via a WiFi network. Generally, a transceiver or network interface transmits and receives signals between electronic devices via a communications link to a network. The network may be a local area network (LAN), wireless LAN (WLAN), public switched telephony network (PTSN), and/or various other wired or wireless networks, including telecommunications, mobile, and cellular phone networks, the internet, a cloud, a peer-to-peer sharing network, and/or any combination of networks thereof that is capable of interconnecting computing devices and/or computer programs. In some examples, the transmission is wireless, although other transmission media and methods may also be suitable.

The one or more hardware processors 104 process the data passing through the various interfaces. For example, the one or more hardware processors 104 may provide a backup application 110 across the various interfaces to computing device 112. The one or more hardware processors 104 may also receive and write the backup data 116 to the data storage device 108, or transmit data to one or more computing devices via the various interfaces. The one or more hardware processors 104 may also control transmission of information, such as authentication keys and certificates, from and to the computing device 112. Additionally, the one or more hardware processors 104 may also receive requests from the backup application 110 executed on the computing device 112, for example to establish an authenticated session 118.

Through the various interfaces, the system 100 may communicate with input/output (I/O) components, such as a keyboard, mouse, or touch interface, that are connected to the computing device 112. The I/O components may also include an output component such as a display. For example, a user may use the I/O components to command the executed backup application 110 on the computing device 112 to perform a backup. The computing device 112, which includes its own hardware processors and memory, processes the user actions such as a key press, mouse click, or screen tap and sends a corresponding signal to the system 100. The command is passed through the various interfaces to system 100 and executed. Similarly, via the various interfaces, the user may also use the executed backup application 114 to command the system 100 to retrieve data stored on the data storage device 108.

The backup application 110 is stored on at least one non-transitory machine-readable medium on the data storage device 108. For example, the backup application 110 may be stored in PROM, EPROM, or FLASH-EPROM as part of the firmware of the data storage device 108. The backup application 110 may also be stored in a mass storage component of the data storage device, such as a solid state drive or a rotating drive. When the system 100 receives the activation signal, the system 100 provides the backup application 110 to the computing device 112 via the various interfaces.

In more detail regarding the activation of the hardware input and the provision of the backup application 110, in some examples, firmware of the data storage device 108 may be programmed to cause the system 100 to provide a backup application 110 from the data storage device 108 to a computing device 112 when the activation signal is received. In other examples, upon activation of the data storage device 108 connected to the computing device 112, the computing device 112 detects the presence of the data storage device 108 and loads a set of device drivers for the data storage device 108. For added security, the device drivers may be signed and verified by the manufacturer of the data storage device 108. The device drivers may also be programmed to request for the computing device 112 to execute the backup application 110 on the computing device 112. In some examples, a permission dialog box may be displayed to the user requesting permission to execute the backup application 110 on the data storage device 108. In other examples, the backup application 110 is a trusted program, and the computing device 112 may use previously stored the permissions to execute backup application 110. As an example, the permissions may be stored in a digitally signed certificate on the computing device 112. In other examples, a trusted executable file configured with an auto-run or auto-launch script already running on the computing device 112 executes the backup application 110 whenever the computing device 112 detects that the data storage device 108 has been activated.

After the backup application 110 is executed on the computing device 112, the system 100 establishes an authenticated session 118 between the data storage device 108 and the executed backup application 114. The executed backup application 114 may authenticate itself to the system 100 using public key infrastructure (PKI), blockchain, or other techniques for providing communication security and identity verification.

Using PKI as an example technique, when the backup application 110 is executed, the executed backup application 114 generates a public key. Data sent by the executed backup application 114 may be encrypted using its own public key, and the encrypted data may be decrypted using the private key of the system 100. For further security, the system 100 may also require a signed certificate from the executed backup application 114.

If a signed certificate is required, the executed backup application 114 may first request an unsigned certificate from a certificate authority (CA), such as the manufacturer of the data storage device 108, or a trusted third party. In some examples, the CA is located on a network and the certificate is stored on a secure website. In other examples, the CA is located on the data storage device and the certificate is embedded in or provided together with the backup application 110, or is embedded in the firmware of the data storage device 108. The certificate may be retrieved to the computing device 112 via the various interfaces.

The executed backup application 114 includes in its certificate request its public key and its identifying information. The CA verifies the identity of the executed backup application 114 to ensure that it is the executed backup application 114, and not some other rogue application or malware, that is requesting the certificate. The CA builds an unsigned certificate, including in the unsigned certificate its own CA information, and hashes it to generate a hash code. The hash code is encrypted using the CA's private key to form a signature and create a signed certificate. The signed certificate is received by the system 100 via the various interfaces, and the system 100 hashes the signed certificate to generate a first hash value. The system 100 also uses the CA's public key to decrypt the signature, generating a second hash value. The system 100 compares both hash values, and if they match, the system may be assured that the public key of the executed backup application 114 has been properly signed by the CA. After the authentication, the system 100 permits the backup data 116 to be received through the executed backup application 114 in a session known as the authenticated session 118. If the authenticated session 118 or backup application is closed, which may be programmed to occur responsive to a completion of the backup process, the entire authentication process may have to be repeated. Moreover, the issued certificate may be usable only once and may have a time-based expiration, reducing the opportunities for malware to exploit the authenticated session 118.

Using the public key and/or other identifying information such as metadata or cryptographic markers, the system 100 is able to distinguish between incoming write requests made by the executed backup application 114 via the authenticated session 118 and other write requests. This example authentication technique provides assurance that the system 100 may safely operate in at least a write mode with respect to the received backup data 120. Returning to the PKI example, in PKI the backup data 116 received via the authenticated session 118 is encrypted using the public key of the executed backup application 114. But in instances where computing resources are constrained, it may be desirable to conduct an authenticated session 118 with reduced encryption and/or authentication, or indeed without any encryption and/or authentication. A session may still be considered authenticated if the system 100 is able to identify the executed backup application 114 based on identifying data such as metadata of the received backup data 120, even if the received backup data 120 are not encrypted.

Where encryption is used, however, an added benefit of encryption is the quarantining of any malware which may have slipped through the various interfaces. This is because the system 100 does not have to decrypt the received backup data 120 as soon as it receives the data. The system 100 may write the received backup data 120 to the data storage device in its encrypted state, and may decrypt the written data 122 at a later time in response to a request to access the written data 122. Unless the malware has the private key of system 100 or is able to commandeer the system to decrypt the malware-infected written data, malware in an encrypted state should be in a quarantined state and be unable to execute. Yet, despite its advantages, encryption is not necessary for an authenticated session 118, or for the system 100 to determine that it may write the received backup data 120 to the data storage device 108.

After system 100 has received the backup data 116 via the authenticated session 118, the system 100 may write the received backup data 120 on computer-readable media of the data storage device 108, such as a solid state drive or a hard disk drive. Although PKI has been used as an example technique for authenticating a session, other techniques which may suit a user's security needs may be used. Indeed, as also discussed, establishing an authenticated session 118 may not even require any encryption or authentication.

Figure 2:
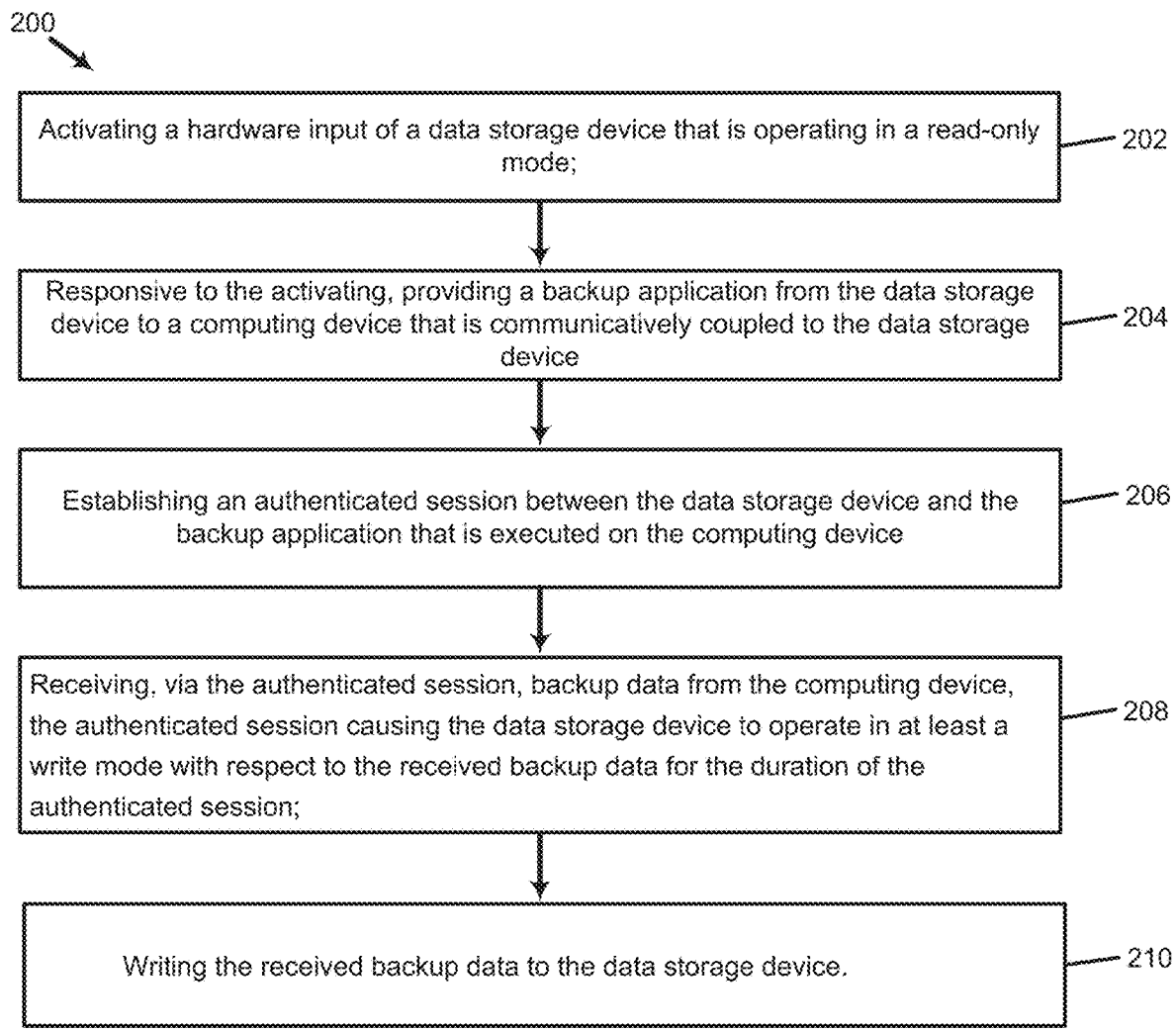
FIG. 2 is a flow diagram illustrating a method for backing up data to a data storage device, in accordance with various examples of the present disclosure.

FIG. 2 is a flow diagram illustrating a method for backing up data to a data storage device, in accordance with various examples of the present disclosure. In some examples, the method is performed by executing computer-readable instructions that are stored in a non-transitory memory using one or more processors. The non-transitory memory and processors may be provided by, for example, the system 100 described with respect to FIG. 1. Additional steps may be provided before, during, and after the steps of method 200, and some of the steps described may be replaced, eliminated and/or re-ordered for other examples of the method 200. For example, establishing an authenticated session may involve a series of authentication steps, such as an exchange of digitally signed certificates, pursuant to the authentication technique used. Method 200 may be performed, for example, in combination with one or more data storage devices 308a or 308b and other elements described with respect to FIG. 3, and/or the steps of method 400 described with respect to FIG. 4. In some examples, method 200 may be performed by one or more data storage devices and/or computing devices.

At action 202, a hardware input of a data storage device that is operating in a read-only mode is activated. The hardware input may be locally or remotely activated by a user. For example, in a single user case, the user may press and/or depress a button on the data storage device to activate the data storage device; in a server environment, a server administrator may activate a switch, which may be hard-wired to a control panel or a master switch, to activate multiple storage devices. In some examples, the data storage device is responsive only after a physical hardware input, which renders purely software-based hacks ineffective or less effective against the method 200. For example, the hardware input may modify a physical jumper to permit or deny writes. The data storage device may need to reboot or reinitialize with the computing device so that the jumper change takes effect, and both actions may be performed by a single activation of the hardware input. In some examples, the programming for the activation is hardcoded in the firmware of the data storage device, such that hacking the activation would require hacking the firmware and updating the hacked firmware to the data storage device. Such a feature would make it more difficult for the activation signal to be hacked. Additionally, the data storage device is operating in a read-only mode prior to the activation, which may further thwart hacking attempts.

A data storage device may operate in a read-only mode by ignoring or blocking all write commands. Write commands may be identified, for example, by an operation code in a command descriptor block. Generally, data storage devices use different operational codes (opcodes) for reads (e.g., 02 h in NVME) as for writes (e.g., 01 h in NVME). Further, the particular opcodes may vary depending on the type of data storage device used (e.g. SCSI vs. NVME), however, the opcodes may be translated between the various types. For example, the opcode for a write command in a SCSI device may be 0 A, but may be 0 Ah when translated to NVME. While particular types of data storage devices and operational codes are identified in the above examples, other types of data storage devices and operational codes may be used, and the techniques described herein are not limited to these examples.

At action 204, responsive to the activation of the hardware input, a backup application is provided from the data storage device to a computing device connected to the data storage device. The backup application, which may be an executable file, may be stored as part of the data storage device's firmware in read-only memory or on other storage components of the data storage device, such as a flash memory or hard disk drive. In some examples, the activation may cause the data storage device to momentarily power off and on again to cause the computing device to re-detect and re-initialize the data storage device. In some examples, the launching of the backup application on the data storage device is included as part of a device driver installation sequence performed each time the data storage device is activated. In some examples, a user may be prompted to install the backup application after the data storage device is activated and detected by the computing device. In some examples, a user may also be asked to install a program or grant permissions (e.g. an autorun script) on the computing device, such that on subsequent activations of the data storage device the program or system would responsively execute, and be permitted to responsively execute, the backup application on the data storage device. In some operating systems, a user would be able to select an "auto-play" action to perform, which includes executing the backup application on the data storage device when the device is connected. In some examples, the backup application does not need to be installed on the computing device, but may be a self-contained executable designed to be run without installation. The data storage device may be connected or communicatively coupled to the computing device by any technique for electronic data communication, including both wired and wireless techniques not limited to: USB, FIREWIRE, THUNDERBOLT, ETHERNET, optic fibers, coaxial cables, telephone cables, WIFI, BLUETOOTH, RFID, NFC, radio waves, optical wireless communications (LI-FI), etc.

At action 206, an authenticated session between the data storage device and the backup application that is executed on the computing device is established. The authenticated session allows data to may be established by PKI or other techniques described with respect to system 100. In some examples, the executed backup application authenticates itself to the data storage device by presenting a digitally signed certificate to the backup application. In some examples, the authentication also includes encryption of the received backup data. In some examples, no secure authentication or encryption techniques are performed. However, the session may still be considered an authenticated session if the system verifies the metadata or other identifying information of the received backup data, such that the system may distinguish between the data received from the executed backup application and the data received from other sources. The system may change the required level of authentication within a session. For example, depending on the user's preferences and settings, the system may require a higher level of authentication initially, but reduce or eliminate it subsequently while still maintaining the session as an authenticated session. The system may also perform authentication spot checks at predetermined intervals or at random intervals, and terminate the authenticated session in response to a failed spot check.

At action 208, backup data is received from the computing device via the authenticated session. Here, the authenticated session causes the data storage device to operate in at least a write mode with respect to the received backup data. For example, the system may permit write opcodes for write operations which contain tagged metadata or other identifier indicating that the write request was made by the executed backup application. The at least a write mode, which includes a write-only mode, a read-and-write mode, a write-and-verify mode, etc., persists with respect to the received backup data for the duration of or during the authenticated session, and terminates when the authenticated session ends. A user may perform a full backup, in which all of the data on the computing device is copied to the data storage device; a partial backup, in which some of the files are copied to the data storage device, and where the files to be copied may be determined by changes to the data stored on the computing device between two time periods, or a comparison between the data on the data storage device and the data on the computing device; or selective backup, in which a user chooses the files to be backed up.

At action 210, the received backup data is written to the data storage device. The received backup data may be written in an encrypted or decrypted state, and the received backup data may be written to a storage component of the data storage device, such as a hard disk drive or solid state flash memory.

Figure 3:
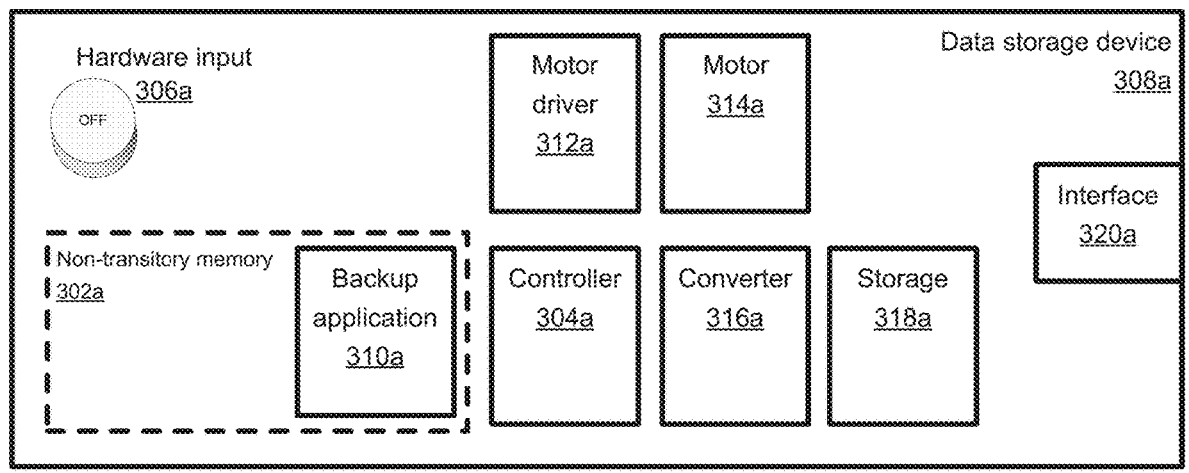
FIG. 3 is an organizational diagram illustrating variations of a data storage device for backing up data, in accordance with various examples of the present disclosure.
Figure 3:
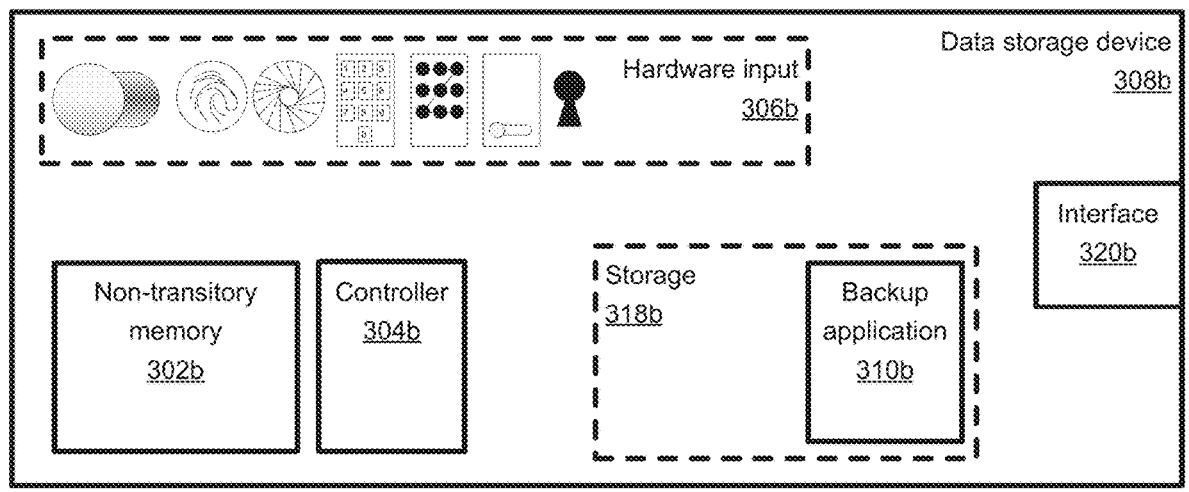

FIG. 3 is an organizational diagram illustrating variations of a data storage device for backing up data, in accordance with various examples of the present disclosure. The data storage device of FIG. 1 and its elements may be replaced, eliminated, and/or re-ordered for other examples of FIG. 3. Methods 200 and 400 may also be performed using the data storage devices 308a or 308b and other elements described with respect to FIG. 3. In some examples, the methods 200 and 400 may be performed using one or more data storage devices. The data storage devices 308a or 308b may include additional features than those depicted in FIG. 3. For example, the data storage devices 308a or 308b may additionally include one or more batteries, an uninterruptible power supply, an external enclosure or dock such as a portable hard disk drive enclosure for interfacing with a computing device, etc.

Data storage device 308a depicts a rotating disk storage device. Data storage device 308a includes a non-transitory memory 302a and a controller 304a. The controller 304a includes one or more hardware processors coupled to the non-transitory memory 302a. The non-transitory memory 302a and the one or more hardware processors in controller 304a are similar in structure and function to those described with respect to system 100 and FIG. 1. The hardware input 306a is similar to hardware input 106A/106B, and here in FIG. 3 is depicted as an on/off button.

The controller 304a controls the operations of the data storage device 308a, and may be of various types (e.g. SCSI controller, Serial Attached SCSI controller, SATA controller, PATA controller, IDE controller, or Fibre Channel controller). The controller 304a controls the flow of data between the data storage device 308a and a connected computing device, and controls the operation of the components of the data storage device 308a. For example, the controller 304a controls a motor driver 312a and a motor 314a, commands the heads to read or write data, etc. The motor driver 312a is a current amplifier positioned between the controller 304a and the motor 314a, and amplifies the current to the motor 314a. The motor 314a includes various motors on the data storage device 308a, such as a spindle motor and an actuator motor. The data storage device 308a may further include a converter 316a, which converts signals from one interface to another, for example from Serial ATA to ATA.

The backup application 310a is similar to backup application 110 of FIG. 1. However, in data storage device 308a, the backup application 310a is included in the non-transitory memory 302a. Storage 318a is a data storage device (e.g., hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read) separate from that which is included in the non-transitory memory 302a. For example, the backup application 310a may be stored in a flash memory of the non-transitory memory 302a.

Data storage device 308a also includes an interface 320a. The interface may be a port, slot, or network interface, similar to that described with respect to system 100 and FIG. 1. Here in FIG. 3, a port interface is shown.

Data storage device 308b depicts a solid state drive (SSD) device. Data storage device 308b includes a non-transitory memory 302b and a controller 304b. The controller 304b includes one or more hardware processors coupled to the non-transitory memory 302b. The non-transitory memory 302b and the one or more hardware processors in controller 304b are similar in structure and function to those described with respect to system 100 and FIG. 1, except that the data storage device aspect of the non-transitory memory 302b is a solid state memory (e.g. flash memory).

Data storage device 308b includes one or more of the various hardware inputs 306b, such as a physical sliding switch; a fingerprint scanner; an image-recognition module, such as those based on cameras, infrared cameras, etc.; a numeric PIN pad; a touch screen with a pattern unlock; a touch screen with a swipe to unlock functionality; and a physical lock requiring a physical key. While particular types of hardware inputs are identified in the above examples, other types of hardware inputs may be used and the techniques described herein are not limited to these examples. The data storage device 308b may remain locked until the correct unlock code is entered, or until the user presents the correct token (e.g. biometric feature) as the case may be. The data storage device 308b may include multiple hardware inputs and may require one or more of them to be correctly entered before unlocking. A user may activate the data storage device 308b after unlocking one or more of the various hardware inputs 306b, or the activation may occur in response to the unlocking. After unlocking the data storage device 308b, the user may schedule future activations.

Depending on user-programmable security settings, the device 308b may unlock without further user identification at the scheduled times in a low security setting, reduced identification (e.g., replying remotely with an email PIN code instead of presenting biometric feature) in a medium security setting, or even full identification (e.g. present biometric feature and enter passphrase) in a high security setting.

In contrast to the data storage device 308a, data storage device 308b is a solid state drive and therefore has no moving components like a motor driver or a motor. Also, unlike in data storage device 308a, the backup application 310b is stored in storage 318b, and not in non-transitory memory 302b. The storage 318b may be any solid state memory, such as flash memory, and the storage 318b may also be used to store the received backup data. The interface 320b may be a port, slot, or network interface.

Figure 4:
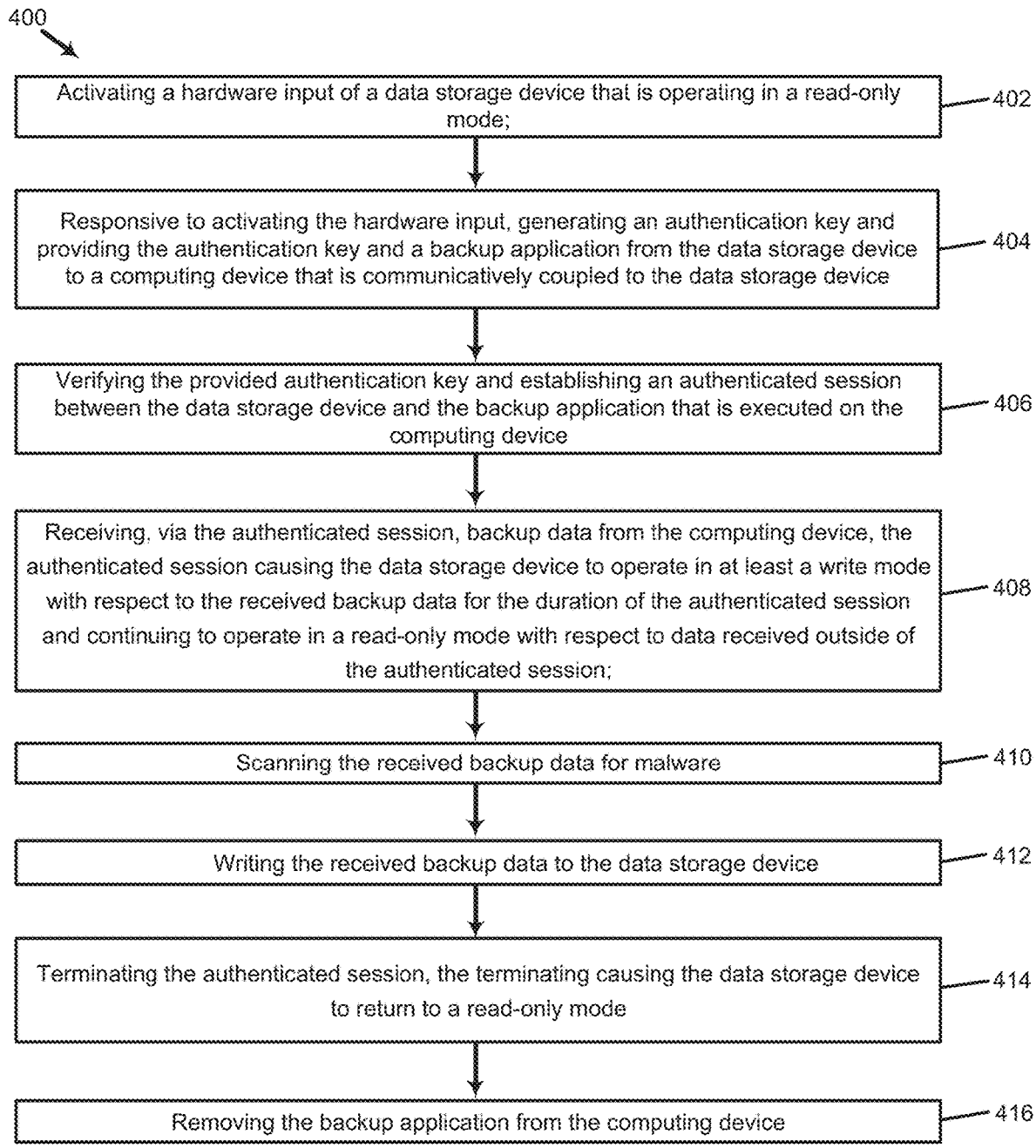
FIG. 4 is a flow diagram illustrating a method for backing up malware-scanned data to a data storage device via an authenticated session, terminating the authenticated session, and removing the backup application, in accordance with various examples of the present disclosure.

FIG. 4 is a flow diagram illustrating a method for backing up malware-scanned data to a data storage device via an authenticated session, terminating the authenticated session, and removing the backup application, in accordance with various examples of the present disclosure. Additional steps can be provided before, during, and after the steps of method 400, and some of the steps described can be replaced, eliminated, and/or re-ordered for other examples of the method 400. Method 400 may be performed, for example, in combination with the steps of method 200 described with respect to FIG. 2. Method 400 may also be performed using the data storage device 308a or 308b and other elements described with respect to FIG. 3. In some examples, method 400 may be performed by one or more data storage devices and/or computing devices.

At action 402, a hardware input of a data storage device that is operating in a read-only mode is activated. Activation may be performed by a user, and may be performed by unlocking various hardware inputs as described in FIG. 3.

At action 404, in addition to providing a backup application from the data storage device to a computing device connected to the data storage device in response to the activation at action 402, the system also generates and provides an authentication key to the computing device. The authentication key may be a public encryption key, such as a PKI public key, which the executed backup application may use to encrypt the backup data. When the system requires access to the encrypted backup data, the system may decrypt the encrypted backup data using a corresponding private encryption key.

The authentication key may also refer to a digital certificate provided by a CA and stored on the data storage device, for example in the firmware of the data storage device or embedded in the backup application stored on the data storage device. In some examples, the unsigned digital certificate is provided to the executed backup application, which fills in the certificate with its public key and identifying information. The same certificate is returned to the CA to verify the identity of the executed backup application, to ensure that it is the executed backup application, and not some other rogue application or malware, that is requesting the certificate. The CA builds an unsigned certificate, including in the unsigned certificate its own CA information, and hashes it to generate a hash code. The hash code is encrypted using the CA's private key to form a signature and create a signed certificate. The system then hashes the signed certificate to generate a first hash value. The system also uses the CA's public key to decrypt the signature, generating a second hash value. The system compares both hash values, and if they match, the system may be assured that the public key of the executed backup application has been properly signed by the CA. After the authentication, the system permits the backup data to be received through the executed backup application in a session known as the authenticated session.

At action 408, the system receives backup data from the computing device via the authenticated session. Here, the authenticated session not only causes the data storage device to operate in at least a write mode with respect to the received backup data for the duration of the authenticated session, it also causes the data storage device to continue to operate in a read-only mode with respect to data received outside of the authenticated session. In some examples, a controller on the data storage device uses the encryption state, cryptographic markers or identifying information of the received backup data to distinguish between data received from the executed backup application and data received from other sources. Continuing with the example, the controller may lift write restrictions as to the backup data received via the executed backup application by allowing write requests from the executed backup application only. Thus, the data storage device would remain in a read-only mode with respect to the data received outside of the authenticated session.

In some examples, only the controller of the data storage device may modify write permissions on the data storage device, and the controller may be programmed, for example, through firmware to only allow such modifications when an authenticated session is running. In other examples, write permissions may be modified by the executed backup application, or more generally, by the computing device.

At action 410, the system scans the received backup data for malware. The scan may be performed, for example, using a malware scanning program provided by the manufacturer of the data storage device, commercial or free anti-virus software, or malware defenders provided with operating systems. The scan may include checking for and retrieving the latest malware definitions prior to the scanning. The scan may be performed before, during, or after the data is received from the executed backup application. For example, the executed backup application may mark all the files to be backed up and allow the system to scan them before they are encrypted or sent. The system may also scan the files as they buffer on the data storage device, or after they are written to the data storage device. Thus action 410 may be performed after action 412. The scan may be performed on both encrypted and unencrypted files, although scanning encrypted files may take longer.

At action 412, the received backup data is written to the data storage device. The received backup data may be written in an encrypted or unencrypted form. The data may be written using techniques such as caching to optimize write speed, wear leveling to reduce wear, writing in contiguous blocks to improve access speed, etc.

At action 414, the authenticated session is terminated. Terminating the authenticated session also closes or ends the duration of the authenticated session (as opposed to suspending it), and causes the operating mode of the data storage device to change from the at least a write mode with respect to the received backup data to a read-only mode. While there are myriad reasons why an authenticated session may be terminated, some reasons could be: termination by the system responsive to the completion of the backup, voluntary termination by a user, involuntary termination due to errors or unforeseen circumstances (e.g. power interruption, drive failure), etc.

In more detail regarding termination responsive to the completion of the backup, the backup may be deemed complete, for example, when the files a user has selected to be backed up have been written to the data storage device. In examples where a partial backup is being performed, e.g. where the executed backup application scans the computing device for changes since the last backup and performs a backup of those changes only, the backup may be deemed complete when those changes are written to the data storage device. In examples where the executed backup application performs a full backup of the computing device, the backup would be completed when the full backup data is written to the data storage device. A backup may also be deemed complete when a user so decides.

Upon termination of the authenticated session, the data storage device resumes its read-only mode. In some examples, the controller of the data storage device may restore its default mode of blocking or ignoring all incoming write commands (write commands may be identifiable by their opcodes). The programming to deny write commands may be located, for example, in the firmware of the data storage device, in a separate non-transitory memory, as part of the intentional or unintentional termination sequence of the authenticated session or executed backup application, or as instructed by the system. In other examples, the data storage device may enter a read-only mode by modifying a write protection jumper. For example, when the hardware input such as a button is activated, the act of depressing the button may lower a jumper located underneath the button onto one or more write-enabling pins, physically allowing the received backup data to be written. Yet, although writes may now physically be permitted, they may still be denied by the controller or the system unless the backup data is received via an authenticated session. When the authenticated session is terminated, a mechanical force exerted by, for example, the user, a spring or an actuator, may return the hardware input (e.g. a button or switch) to its inactive position, removing the jumper from the one or more write-enabling pins and returning the data storage device to a read-only mode.

At action 416, the backup application is removed from the computing device. In some examples, the system may perform the removal by an uninstallation. The uninstallation may be performed responsive to the termination of the authenticated session. In other examples, a user may be prompted to remove the backup application upon termination of the authenticated session. In further examples, the backup application will remove or uninstall itself upon termination of the authenticated session. In cases where the backup application is run as a standalone executable without being installed on the computing device, the removal of the backup application includes shutting down computer processes associated with or started by the backup application. If an autorun program is used to launch the backup application on activation of the hardware input, the autorun program may be shut down as well or rebooted.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure. Although illustrative examples have been shown and described, a wide range of modification, change and substitution is contemplated in the foregoing disclosure and in some instances, some features of the examples may be employed without a corresponding use of other features. In some instances, actions may be performed according to alternative orderings. One of ordinary skill in the art would recognize many variations, alternatives, and modifications. Thus, the scope of the invention should be limited only by the following claims, and it is appropriate that the claims be construed broadly and in a manner consistent with the scope of the examples disclosed herein.

What is claimed is:

1. A system comprising:
a non-transitory memory; and
one or more hardware processors coupled to the non-transitory memory to execute instructions from the non-transitory memory to perform operations comprising:
receiving an activation signal from a hardware input of a data storage device that is operating in a read-only mode, wherein the hardware input includes a hardware switch;
responsive to the receiving, providing a backup application from the data storage device to a computing device that is communicatively coupled to the data storage device;
establishing an authenticated session between the data storage device and the backup application that is executed on the computing device;
receiving, via the authenticated session, backup data from the computing device, the authenticated session causing the data storage device to operate in at least a write mode with respect to the received backup data during the authenticated session;
writing the received backup data to the data storage device; and
returning to the read-only mode in response to termination of the authenticated session.

2. The system of claim 1, wherein the data storage device continues to operate in a read-only mode with respect to data received outside of the authenticated session.

3. The system of claim 1, wherein the providing of the backup application further comprises:
generating an authentication key; and
providing the authentication key to the computing device.

4. The system of claim 3, wherein the establishing the authenticated session includes verifying the provided authentication key.

5. The system of claim 1, wherein the received backup data is scanned for malware.

6. The system of claim 1 further comprising:
terminating the authenticated session.

7. The system of claim 6, wherein the terminating includes removing the backup application from the computing device.

8. A computer-implemented method comprising:
receiving an activation signal from a hardware input of a data storage device that is operating in a read-only mode, wherein the hardware input includes a hardware switch;
responsive to the receiving, providing a backup application from the data storage device to a computing device that is communicatively coupled to the data storage device;
establishing an authenticated session between the data storage device and the backup application that is executed on the computing device;
receiving, via the authenticated session, backup data from the computing device, the authenticated session causing the data storage device to operate in at least a write mode with respect to the received backup data during the authenticated session;

writing the received backup data to the data storage device; and returning to the read-only mode in response to termination of the authenticated session.

9. The method of claim 8, wherein the data storage device continues to operate in a read-only mode with respect to data received outside of the authenticated session.

10. The method of claim 8, wherein the providing of the backup application further comprises:

generating an authentication key; and providing the authentication key to the computing device.

11. The method of claim 10, wherein the establishing the authenticated session includes verifying the provided authentication key.

12. The method of claim 8, wherein the received backup data is scanned for malware.

13. The method of claim 8 further comprising:

terminating the authenticated session.

14. The method of claim 13, wherein the terminating includes removing the backup application from the computing device.

15. A non-transitory machine-readable medium having stored thereon machine-readable instructions executable to cause at least one machine to perform operations comprising:

receiving an activation signal from a hardware input of a data storage device that is operating in a read-only mode, wherein the hardware input includes a hardware switch;

responsive to the receiving, providing a backup application from the data storage device to a computing device that is communicatively coupled to the data storage device;

establishing an authenticated session between the data storage device and the backup application that is executed on the computing device;

receiving, via the authenticated session, backup data from the computing device, the authenticated session causing the data storage device to operate in at least a write mode with respect to the received backup data during the authenticated session; and writing the received backup data to the data storage device; and returning to the read-only mode in response to termination of the authenticated session.

16. The non-transitory machine-readable medium of claim 15, wherein the data storage device continues to operate in a read-only mode with respect to data received outside of the authenticated session.

17. The non-transitory machine-readable medium of claim 15, wherein the providing of the backup application further comprises:

generating an authentication key; and providing the authentication key to the computing device.

18. The non-transitory machine-readable medium of claim 17, wherein the establishing the authenticated session includes verifying the provided authentication key.

19. The non-transitory machine-readable medium of claim 15, wherein the received backup data is scanned for malware.

20. The non-transitory machine-readable medium of claim 15 further comprising:

terminating the authenticated session.

* * * * *